United States Patent Office 3,317,627
Patented May 2, 1967

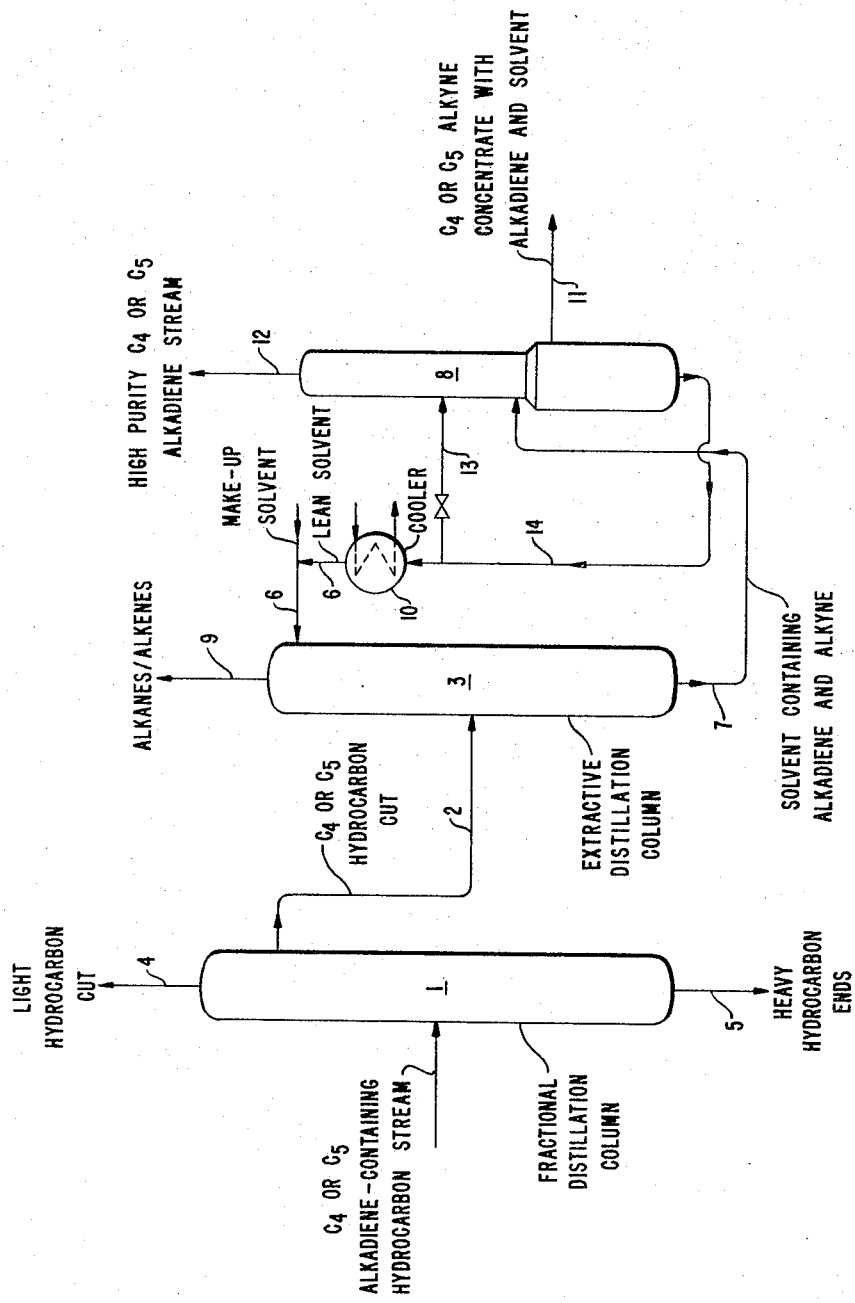

3,317,627
HIGH PURITY ALKADIENES BY EXTRACTIVE DISTILLATION
Ralph W. King, London, England, and Hendrik Mondria, Amsterdam, Netherlands, assignors to Shell Oil Company, New York, N.Y., a corporation of Delaware
Filed Oct. 22, 1964, Ser. No. 405,852
Claims priority, application Great Britain, Oct. 25, 1963, 42,202/63
8 Claims. (Cl. 260—681.5)

This invention relates to an improved process for purifying alkadienes, and in particular, a process for the removal of alkynes from alkadienes in an extractive distillation process with polar solvents.

Alkadienes, particularly butadiene and isoprene, are important starting materials for the chemical industries and are prepared commercially by dehydrogenation of more saturated hydrocarbons. Butadiene, for instance, is prepared from n-butane or n-butene by dehydrogenation over certain catalysts, such as the so-called Houdry catalysts or from n-butene over potassium promoted iron oxide chromic catalysts or over calcium nickel phosphate catalysts. Another useful process is iodinative dehydrogenation of the more saturated alkanes and/or alkenes.

Common to all these types of dehydrogenation processes is the formation of alkynes which contaminate the alkadienes obtained in such processes, although the extent of such contamination depends on the exact composition of the feed and conditions and type of dehydrogenation process used. Therefore, it is necessary to find satisfactory and economical methods of separating the alkadienes from the other products of the dehydrogenation reactions, particularly the alkynes because of their deleterious effects in chemical reactions. It is customary to separate a $C_4$ or $C_5$ hydrocarbon cut from the dehydrogenation process product stream by conventional distillation techniques. These separated $C_4$ or $C_5$ hydrocarbon cuts contain mixtures of compounds, including alkynes whose normal volatilities are such that separation cannot be readily achieved with ordinary fractional distillation. Therefore it is commonly followed by treating the $C_4$ or $C_5$ hydrocarbon cut by extractive distillation with a polar solvent such as acetonitrile, acetone, furfural, dimethylformamide, dioxane, phenol, and N-methylpyrrolidone, or their corresponding aqueous admixtures.

In such separations the $C_4$ or $C_5$ cut of the product stream from the dehydrogenation process is subjected to extractive distillation with a polar solvent to obtain the desired alkadiene product which also contain alkynes having a similar number of carbon atoms since the polar solvent absorbs both alkadienes and alkynes. For instance, a $C_4$ butadiene-containing stream obtained by fractionally distilling a dehydrogenated product stream is fed to an extractive distillation column equipped with condenser, reboiler, and means to return a portion of the condensed vapor as reflux to the top of the column. A suitable polar solvent, such as an acetonitrile water mixture, is supplied at a point near the top of the column and the $C_4$ hydrocarbon cut is supplied to an intermediate section of the column. The presence of polar solvent increases the relative volatility of the paraffinic and mono-olefins $C_4$ hydrocarbons relative to the butadiene and its $C_4$-alkyne contaminant so that the $C_4$ paraffins and mono-olefins are separated as overhead product with the mixture of butadiene containing its alkyne impurity and solvent being removed as a rich extract stream from the base of the column. This rich extract stream is then fed to a conventional stripping column, generally at a point near the middle section of the stripping column. Through the stripping action a concentrated butadiene product stream contaminated with alkynes is recovered as overhead with the solvent removed as bottoms and returned to the extractive distillation column via a cooler. This same process is generally applied also to the isolation of isoprene from a corresponding $C_5$-dehydrogenation mixture.

A serious disadvantage of the extractive distillation methods of obtaining the alkadiene concentrate is that such concentrates are still contaminated with the alkynes, particularly alkynes having the same number of carbon atoms as the alkadiene obtained as product. The presence of alkynes in the alkadiene concentrates makes them unsatisfactory starting materials for many chemical processes, especially for the preparation of quality elastomers since even small amounts of alkynes (i.e., above 300 p.p.m.) unfavorably affect the polymerization reaction. Thus, where high purity alkadiene product streams are desired, it is necessary to subject the alkadiene product stream from the stripping column to further purification to remove the alkyne.

Accordingly, it is one of the principal objects of the present invention to provide an improved process which yields high purity alkadiene concentrates low in alkyne contaminants.

Another object is the provision of an improved process whereby the present existing equipment can be economically modified to yield high purity alkadienes concentrate low in alkyne contaminants.

Also, it is an object to improve the economies and obtain high purity alkadiene concentrates low in alkyne concentration without subsequent purification treatments of alkadiene concentrates after the extractive distillation step.

The above objects and others which will be understood more fully from the description of the invention which is based on the findings that in the stripping process whereby the solvent is recovered, the alkyne contaminant tends to concentrate in a section between the top and base of the stripping column.

Briefly stated the invention involves subjecting a $C_4$ or $C_5$ hydrocarbon cut containing alkadienes and alkynes to extractive distillation with a polar solvent to extract the alkadienes and alkynes from the more saturated hydrocarbons, and separating the solvent from the absorbed hydrocarbons in an upright elongated solvent stripping zone while withdrawing from the stripping zone a side stream of alkadiene, and polar solvent enriched in alkyne (having a higher alkyne concentration than the mixture being extractively distilled) and recovering a high purity alkadiene product low in alkyne contaminates directly overhead from the stripping zone.

The location of the section of the stripping column in which the alkyne concentrates depends upon the volatility of the alkyne, that of the alkadiene, and that of the polar solvent employed. For example, in the purification of butadiene, an aqueous acetonitrile solvent extract will generally have a butadiene content of 1–10% by weight and the vinylacetylene (alkyne) contaminant co-absorbed with the butadiene tends to concentrate near the middle of the stripping column during the stripping operation, since under these conditions, the volatility of the vinylacetylene is about halfway between that of butadiene and aqueous acetonitrile. This invention takes advantage of this phenomenon to accomplish its objects by withdrawing from the stripping column a side stream at or near the section of the stripping column having the high alkyne concentration thereby drastically reducing the alkyne concentration in the alkadiene recovered as overhead from the stripping column. By the instant process, it is now possible to obtain alkadiene concentrates containing less than 300 p.p.m. (parts per million) and often less than 100 p.p.m. of alkyne in the alkadiene product stream directly as overhead from the stripping column in an extractive distillation process, eliminating the necessity of further purification treatments.

In order that those skilled in the art may fully appreciate the nature of this invention and a method for carrying it out, the accompanying single figure drawing illustrates a simplified flow diagram for the process.

In practice, this invention may be carried out in various ways. But in general, referring to the drawing, hydrocarbons mixtures obtained as a product stream from a catalytic dehydrogenation is separated into various hydrocarbon cuts by the use of a conventional fractional distillation in distilling column 1. An essentially one-carbon range hydrocarbon cut containing alkadiene to be isolated is taken off via line 2 and fed to an intermediate section of a conventional extractive distillation column 3. The lighter hydrocarbons are removed from column 1 as overhead via line 4, while the heavier hydrocarbons are removed as bottoms via line 5.

The alkadiene-containing cut entering the extractive distillation column 3 via line 2 is subjected to countercurrent contact therein with a polar solvent entering via line 6 near the top of the column. The resulting solvent extract of alkadiene and alkyne is withdrawn as bottoms through line 7. The more saturated hydrocarbons in the cut (i.e., alkanes and alkenes) are recovered as overhead from extractive distillation column 3 through line 9 and are usually returned to the dehydrogenation operation.

The solvent extract containing the alkadiene and alkyne is fed through line 7 to solvent stripper column 8 at or near the middle of thereof. During the stripping operation, the alkadiene and alkynes are separated from solvent which is withdrawn as bottoms through line 14. The solvent is then returned through cooler 10 and via line 6 to extractive distillation column 3. A side stream of alkadiene, alkyne and polar solvent is withdrawn from stripper column 8 via line 11 during the stripping operation. This side stream is preferably removed at a point below the entry of the polar solvent containing the alkadiene and alkyne but above the base of the solvent stripper. The removal of the side stream allows the high purity alkadiene, of extremely low alkyne concentration, to be recovered as overhead from the solvent stripper column 8 via line 12.

By adjusting the flow rate of the side stream, and the reflux ratio of stripper column 8, 99% of the alkyne can be removed. Thus, the alkadiene recovered through line 12 will have an extremely low alkyne concentration (less than 300 p.p.m.) and will be suitable for the production of quality elastomers without the necessity of further purification.

The side stream is preferably withdrawn as a vapor phase and its composition will vary according to the point of withdrawal. However, it is also possible to withdraw a liquid side stream when the stripping column is operated under pressure. By lowering the withdrawal point the concentration of the alkadiene is reduced and that of the solvent is increased with the reverse being true as the point of withdrawal of the side stream moves up the column. In practice, it has been found that it is preferred to withdraw the side stream at a point in the lower third of the stripping column when working with butadiene or isoprene.

For example, an especially suitable withdrawal point on a column having 80–100 trays is at a point between the 10th and 25th tray from the base of the column. If the alkadiene being recovered is butadiene, the vaporous side stream will have approximately the following composition:

| | Percent |
|---|---|
| Polar solvent | 90 |
| Vinyl acetylene | 5 |
| Butadiene | 5 |

It is desirable that the stripping column be operated so as to obtain a side stream alkyne to alkadiene ratio of 1:1, and preferably more alkyne than alkadiene. This is a substantial change from the 1 to 50 ratio of alkyne to alkadiene in the feed to the extractive column which is typically found in $C_4$ to $C_5$ hydrocarbon cuts from dehydrogenation product streams.

It was also found to be particularly advantageous to recycle a portion of the polar solvent recovered from the base of the stripping column as additional reflux to the stripping column. This reflux is fed to the stripping column above the feed point of the solvent extract. The volatility of the alkyne with respect to the alkadiene is thereby further depressed in the upper section thus facilitating a more complete concentration and removal of the alkyne in the side stream. This optional recycle line is indicated by valved line 13. It is also preferred that a portion of alkadiene product be refluxed in the top of the stripping column. A reflux ratio of 4–7 times the off product is desirable. This reflux can be provided by return of a portion of condensed overhead, or suitable partial condensing means can be provided in the top section of the stripper.

The side stream removed from the stripping column can be treated in a number of ways. One method is to feed the side stream to a second stripping column whereby the polar solvent can be recovered and the separated alkadiene, contaminated with alkyne, recovered merely discarded without any further attempt at purification. Economy demands a method for the recovery of the polar solvent for further use in the extractive distillation step in view of the high concentration of polar solvent in the side stream. Another method of treating the side stream effluent is to condense it to a liquid state and strip it in a separate column with an inert gas such as nitrogen.

Once the side stream is stripped to recover the polar solvent, the alkadiene and alkyne concentrate may be treated in a number of ways. The alkadiene/alkyne concentrate, which is composed of nearly equal portions of both, may be recycled to the dehydrogenation reactor where some alkyne is converted to alkadiene, especially in the iodinative dehydrogenation processes. It may be selectively hydrogenated to convert alkyne to alkadiene and then recycled to the extracive distillation column, as an alternative.

It will be clear from the description that the invention lends itself to independent operation but will have the greatest advantage when incorporated in an integrated process which includes processing the side stream fully. Also, the invention is primarily designed for the purification of butadiene (1,3-butadiene) and isoprene.

The following example is illustrative of the invention but is not intended as a limitation thereof.

*Example I*

From a dehydrogenation product stream a $C_4$ cut was recovered and fed to a lower section of conventional extractive distillation column using aqueous acetonitrile as the polar solvent. This solvent contained about 10 mol percent of water. An extract stream from the extractive distillation with acetonitrile/water solvent of a $C_4$ butadiene-containing hydrocarbon fraction, consisting of 94.1% w. aqueous acetonitrile and 5.9% w. hydrocarbons (97.7% butadiene, 1.1% butenes and 1.2% vinylacetylene) was fed to tray 30 (tray [1] is the bottom tray) of a stripping column having 90 trays. On tray 90 a product reflux was added at a rate of 5.8 times the net quantity of the top butadiene product. A portion of aqueous acetonitrile, coming from the bottom of the stripping column, was fed to tray 70 as recycle, this solvent flow being approximately 1.8 times the product of reflux flow. A vapor side stream, containing 94.6% w. aqueous acetonitrile, 2.8% w. butadiene, and 2.6% w. vinylacetylene was withdrawn at tray 17. This stream was condensed and fed into a hydrocarbon-solvent separation column, where most of the hydrocarbons were stripped off by inert gas. The remaining solvent, containing 98.7% w. aqueous acetonitrile, 0.5% w. butadiene, and 0.8% w. vinylacetylene was recycled to tray 17 of the stripping column.

Under the above conditions a butadiene product stream containing less than 300 p.p.m. vinylacetylene was obtained from the top of the stripping column.

We claim as our invention:

1. An improved extractive distillation process for recovering a $C_4$ to $C_5$ alkadiene low in alkyne contaminant from an alkadiene and alkyne containing $C_4$ to $C_5$ hydrocarbon mixture obtained from a more saturated $C_4$ to $C_5$ aliphatic hydrocarbon by dehydrogenation which comprises subjecting such $C_4$ to $C_5$ hydrocarbon mixture to extractive distillation with a selective polar solvent to produce and separate a solvent extract of alkadienes and alkynes from more saturated hydrocarbons, stripping the extracted hydrocarbons from said solvent extract in an upright elongated stripping zone while removing a side stream from said stripping zone having a greater alkyne-to-alkadiene ratio than said solvent extract and recovering an alkadiene overhead product of substantially reduced alkyne content.

2. A process according to claim 1 in which the side stream is removed at a rate sufficient to insure that the alkadiene overhead product recovered from the stripping zone contains less than 300 p.p.m. of alkyne.

3. A process according to claim 1 in which the side stream is withdrawn at a point in the lower third section of the stripping zone.

4. A process according to claim 1 in which the polar solvent is aqueous acetonitrile having at least 10 mol percent water.

5. A process according to claim 1 in which the polar solvent is selective from the group consisting of acetonitrile, acetone, furfural, dimethylformamide, dioxane, phenol and N-methylpyrrolidone and aqueous admixtures thereof.

6. A process according to claim 1, in which the alkyne to alkadiene ratio in the side stream is approximately 1 to 1.

7. A method of preparing a $C_4$ to $C_5$ alkadiene low in alkyne content, which comprises the dehydrogenation of a $C_4$ to $C_5$ hydrocarbon having more saturation than a diene, subjecting the dehydrogenated product stream to extractive distillation with a selective polar solvent to produce and separate a solvent extract of alkadienes and alkynes from more saturated hydrocarbons, stripping the extracted hydrocarbons from said solvent extract in an upright elongated stripping zone while removing a side stream from said stripping zone having a greater alkyne-to-alkadiene ratio than said solvent extract, recovering an alkadiene overhead product of substantially reduced alkyne content in said stripping zone, separating the selective polar solvent from said side stream, and recycling the alkyne concentrate remaining after separating the selective polar solvent from said side stream to the dehydrogenation stage.

8. A method according to claim 7, in which the dehydrogenation is iodinative dehydrogenation.

References Cited by the Examiner

UNITED STATES PATENTS

| | | | |
|---|---|---|---|
| 3,000,794 | 9/1961 | Tschopp | 260—681.5 |
| 3,013,952 | 12/1961 | Clay | 260—681.5 |
| 3,070,641 | 12/1962 | Herndon et al. | 260—681.5 |
| 3,230,157 | 1/1966 | Hill et al. | 260—681.5 |
| 3,242,227 | 3/1966 | Kroeper et al. | 260—681.5 |

DELBERT E. GANTZ, *Primary Examiner.*

G. S. SCHMITKONS, *Assistant Examiner.*